United States Patent
Thakur et al.

(10) Patent No.: US 12,469,957 B2
(45) Date of Patent: Nov. 11, 2025

(54) METHOD AND APPARATUS FOR IMPLEMENTING HOST-CENTRIC ANTENNA CONTROL

(71) Applicant: Intel Corporation, Santa Clara, CA (US)

(72) Inventors: Jayprakash Thakur, Bangalore (IN); Samir V. Gundawar, Bangalore (IN); Madhukiran Sreenivasareddy, Bangalore (IN); Poondi Balaji Venkatachalapath Gopi Sudarson, Bangalore (IN); Mythili Hegde, Bangalore (IN); Ashish Upadhyaya, Bengaluru (IN)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 17/448,712

(22) Filed: Sep. 24, 2021

(65) Prior Publication Data
US 2022/0200133 A1 Jun. 23, 2022

(30) Foreign Application Priority Data
Dec. 23, 2020 (EP) .................................... 20216819

(51) Int. Cl.
*H01Q 1/24* (2006.01)
*H01Q 1/22* (2006.01)
(Continued)

(52) U.S. Cl.
CPC ........... *H01Q 1/243* (2013.01); *H01Q 1/2266* (2013.01); *H01Q 1/245* (2013.01); *H01Q 1/521* (2013.01);
(Continued)

(58) Field of Classification Search
CPC ...... H01Q 1/243; H01Q 1/2266; H01Q 1/245; H01Q 1/521; H01Q 3/24; H01Q 5/335;
(Continued)

(56) References Cited

U.S. PATENT DOCUMENTS

| 2012/0046003 A1* | 2/2012 | Ying ...................... H04B 1/406 455/90.2 |
| 2013/0120200 A1* | 5/2013 | Desclos ................. H01Q 1/521 343/745 |

(Continued)

FOREIGN PATENT DOCUMENTS

WO  WO-2021066855 A1 *  4/2021  ........... H04B 7/0608

*Primary Examiner* — Dameon E Levi
*Assistant Examiner* — Yonchan J Kim
(74) *Attorney, Agent, or Firm* — 2SPL Patent Attorneys PartG mbB; Yong Beom Hwang

(57) ABSTRACT

A method and apparatus for implementing host-centric antenna control. An apparatus may include a plurality of antennas for wireless transmission and reception, a wireless modem for processing a signal for wireless transmission and reception via the antennas, a processor (host), and an antenna tuner circuitry. The processor is configured to run an antenna tuner software module configured to generate a control signal to configure at least one antenna. The antenna tuner circuitry is configured to switch or tune the at least one antenna based on the control signal. The apparatus may include at least one sensor coupled to the processor. The antenna tuner software module may be configured to generate the control signal based on inputs from the at least one sensor. The antenna tuner software module may be configured to receive RF parameters from the wireless modem and generate the control signal based on the RF parameters.

18 Claims, 18 Drawing Sheets

(51) Int. Cl.
*H01Q 1/52* (2006.01)
*H01Q 3/24* (2006.01)
*H01Q 5/335* (2015.01)
*H01Q 21/28* (2006.01)
*H01Q 25/04* (2006.01)
*H04B 1/04* (2006.01)
*H04B 1/18* (2006.01)
*H04B 1/40* (2015.01)

(52) U.S. Cl.
CPC .............. *H01Q 3/24* (2013.01); *H01Q 5/335* (2015.01); *H01Q 21/28* (2013.01); *H01Q 25/04* (2013.01); *H04B 1/0458* (2013.01); *H04B 1/18* (2013.01); *H04B 1/40* (2013.01)

(58) Field of Classification Search
CPC ...... H01Q 21/28; H01Q 25/04; H04B 1/0458; H04B 1/18; H04B 1/40; H04B 1/401; H04B 7/0404
See application file for complete search history.

(56) References Cited

U.S. PATENT DOCUMENTS

| | | |
|---|---|---|
| 2015/0171914 A1 | 6/2015 | Desclos et al. |
| 2019/0027821 A1* | 1/2019 | Judkins .................. H01Q 1/521 |
| 2021/0218430 A1* | 7/2021 | Han ......................... H04B 1/18 |
| 2021/0408671 A1* | 12/2021 | Kim ......................... H01Q 3/24 |

* cited by examiner

METHOD AND APPARATUS FOR IMPLEMENTING HOST-CENTRIC ANTENNA CONTROL

FIELD

Examples relate to a wireless communication device, more particularly a method and apparatus for implementing host-centric antenna control.

BACKGROUND

A user equipment such as a laptop computer includes antennas for wireless communications. Current laptop computer design has several different modes of operations, such as clamshell, tablet, closed lid, 360 degree, etc. Getting better wireless connectivity in all the operation modes and meeting regulatory compliance are really a challenge due to antenna placement constraints in the system. To overcome this problem, smart antenna technology has been suggested in such wireless systems.

BRIEF DESCRIPTION OF THE FIGURES

Some examples of apparatuses and/or methods will be described in the following by way of example only, and with reference to the accompanying figures, in which.

DETAILED DESCRIPTION

Figure 1:
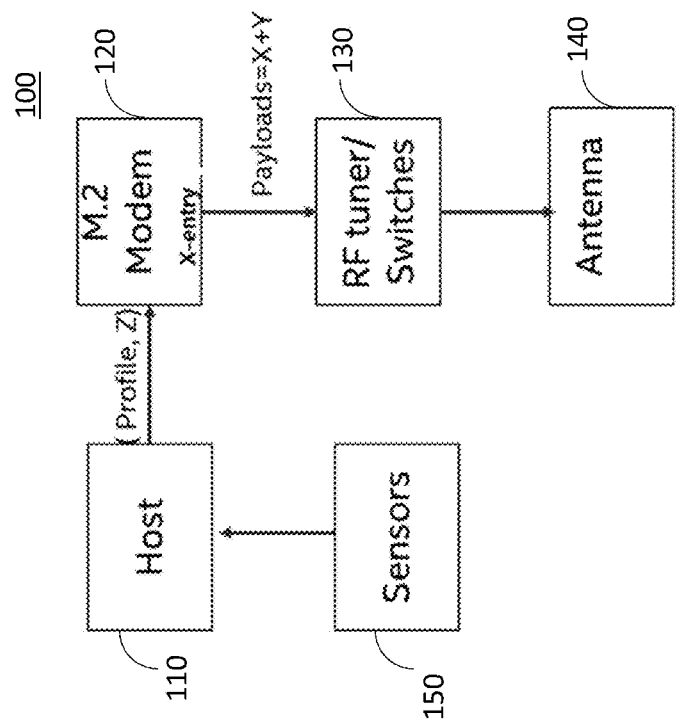
FIG. 1 is a block diagram of an example system configured to implement a modem-centric antenna control mechanism.

Various examples will now be described more fully with reference to the accompanying drawings in which some examples are illustrated. In the figures, the thicknesses of lines, layers and/or regions may be exaggerated for clarity.

Accordingly, while further examples are capable of various modifications and alternative forms, some particular examples thereof are shown in the figures and will subsequently be described in detail. However, this detailed description does not limit further examples to the particular forms described. Further examples may cover all modifications, equivalents, and alternatives falling within the scope of the disclosure. Like numbers refer to like or similar elements throughout the description of the figures, which may be implemented identically or in modified form when compared to one another while providing for the same or a similar functionality.

It will be understood that when an element is referred to as being "connected" or "coupled" to another element, the elements may be directly connected or coupled or via one or more intervening elements. If two elements A and B are combined using an "or", this is to be understood to disclose all possible combinations, i.e. only A, only B as well as A and B. An alternative wording for the same combinations is "at least one of A and B". The same applies for combinations of more than 2 elements.

The terminology used herein for the purpose of describing particular examples is not intended to be limiting for further examples. Whenever a singular form such as "a," "an" and "the" is used and using only a single element is neither explicitly or implicitly defined as being mandatory, further examples may also use plural elements to implement the same functionality. Likewise, when a functionality is subsequently described as being implemented using multiple elements, further examples may implement the same functionality using a single element or processing entity. It will be further understood that the terms "comprises," "comprising," "includes" and/or "including," when used, specify the presence of the stated features, integers, steps, operations, processes, acts, elements and/or components, but do not preclude the presence or addition of one or more other features, integers, steps, operations, processes, acts, elements, components and/or any group thereof.

Unless otherwise defined, all terms (including technical and scientific terms) are used herein in their ordinary meaning of the art to which the examples belong.

Examples are disclosed for a method and apparatus for a host-centric antenna control. In accordance with examples, smart antenna features, such as antenna tuning, best antenna selection (BAS), specific absorption rate (SAR) control, radio frequency module (RFM) selection or switching, transmit power control, or the like are controlled by a host in an apparatus (e.g. a central processing unit (CPU) or an application processor (AP) in the apparatus) instead of a wireless modem in the apparatus. The apparatus may be a user equipment. As an example, the user equipment may be a laptop computer, a desktop computer, a mobile phone, a smart phone, a tablet computer, any wearable devices with wireless communication capabilities, or the like. Hereafter, examples will be explained with reference to a user equipment. However, it should be noted that the examples are not limited to a user equipment, but applicable to any type of apparatus such as a network device as well.

In accordance with examples, an apparatus (e.g. a user equipment) may include a plurality of antennas for wireless transmission and reception, a wireless modem, a processor (host), and an antenna tuner circuitry. The wireless modem is for processing a signal for wireless transmission and reception via at least one of the antennas. The wireless modem may be a wireless wide area network (WWAN)

modem or a wireless local area network (WLAN) modem or may include both. The wireless modem may support any wireless communication protocols including, but not limited to, Third Generation (3G), Fourth Generation (4G), Fifth Generation (5G), IEEE 802.xx based WLAN protocols, Bluetooth, Global Navigation Satellite System (GNSS), or the like.

The processor is a host in the apparatus and may be, for example a CPU or an AP of the user equipment. An antenna tuner software module is included as a part of applications running on the processor. In accordance with examples, the antenna tuner software module running on the host controls the antenna tuner hardware circuitry. The antenna tuner software module is configured to implement the smart antenna features such as antenna tuning, BAS, SAR control, RFM selection or switching, transmit power control, or the like. The antenna tuner software module may be configured to generate a control signal to configure at least one antenna. For example, the antenna tuner software module may select one or more antennas from the plurality of antennas based on predetermined criteria for BAS, or for resolving an SAR issue, or the like. The antenna tuner circuitry is configured to perform antenna tuning based on the control signal from the host/processor.

The apparatus may optionally further include at least one sensor. For example, the sensor may be a proximity sensor, an SAR sensor, a Hall sensor, an accelerometer, or the like. The sensor(s) is coupled to the processor. The antenna tuner software module may generate the control signal based on the inputs from the at least one sensor. In some examples, a use case of the apparatus may be determined based on the inputs from the at least one sensor and the antenna tuner software module may generate the control signal in accordance with the determined use case of the user equipment. The use case is associated with the mode or way the apparatus is used or operates and may be determined based on the sensor inputs.

In some examples, the antenna tuner software module may receive RF parameters such as an operating frequency of the apparatus from the wireless modem and generate the control signal based on the RF parameters.

The antenna tuner software module running on the host may control the antenna tuner hardware circuitry to implement the smart antenna features. For example, the antenna tuner software module may be configured to select one or more antennas for transmission or reception based on inputs from the at least one sensor for implementing BAS or SAR control. The apparatus may include a plurality of radio frequency modules (RFMs) and the antenna tuner software module may select or switch an RFM for transmission and reception based on the inputs from the at least one sensor.

The antenna tuner software module may be configured to select an antenna profile (a look-up table (LUT)) among a plurality of profiles (LUTs) based on the inputs from the sensor(s). Each antenna profile (LUT) may be associated with each use case of the user equipment. The antenna tuner software module may be configured to select an entry for antenna tuning in the selected antenna profile based on the RF parameters received from the wireless modem. The antenna tuner software module may be configured to send the control signal to the antenna tuner circuitry using one of a mobile industry processor interface-radio frequency front-end (MIDI-RFFE) interface, a general purpose input/output (GPIO), or a GPIO-emulated RFFE interface.

In another example, a method for controlling an antenna in an apparatus is provided. The apparatus includes a plurality of antennas, a processor, an antenna tuner circuitry, at least one sensor (optional), and a wireless modem. In one example, an antenna tuner software module running on the processor generates a control signal to configure at least one antenna. The antenna tuner software module running on the host may control the antenna tuner hardware circuitry to implement the smart antenna features. The antenna tuner software module sends the control signal to the antenna tuner circuitry. The antennas are tuned by the antenna tuner circuitry based on the control signal.

In some example, the antenna tuner software module may receive inputs from at least one sensor and generate the control signal based on the inputs from the at least one sensor. The antenna tuner software module may receive RF parameters from the wireless modem and generate the control signal based on the RF parameters.

FIG. 1 is a block diagram of an example system 100 configured to implement a modem-centric antenna control mechanism. In a modem-centric antenna control, smart antenna features are implemented based on modem functionalities. For example, an antenna tuner, BAS, or SAR are controlled by a wireless modem in the system 100.

The system 100 includes a host 110, a modem 120, an antenna tuner 130, one or more antennas 140, and one or more sensors 150. The host 110 is a main processor of the system 100 and may be a CPU, an application processor (AP), or the like. The modem 120 is configured to process signals for wireless transmission and reception via one or more of the antennas 140. The modem 120 may support Third Generation (3G), Fourth Generation (4G), Fifth Generation (5G) cellular communication protocols, IEEE 802.11-based wireless local area network (WLAN) protocols, Global Navigation Satellite System (GNSS), or the like. The antenna tuner 130 (RF tuner/switches) is a device to improve power transfer between a transmitter and the antenna by matching the specified load impedance of the transmitter to the combined input impedance of the feedline and the antenna.

The host 110 receives inputs from the sensors 150 and selects an antenna profile based on the sensor inputs. The sensors 150 may be a proximity sensor, an SAR sensor, an accelerometer, etc. A proximity sensor is a sensor that can detect the presence of nearby objects without any physical contact. An SAR is a measure of the rate at which radio frequency (RF) energy is absorbed by a human body when exposed to an electromagnetic field. An SAR sensor may detect a presence of a nearby human body. An accelerometer is a device used to measure acceleration forces. The host 110 selects an antenna profile based on inputs from one or more sensors, and sends a signal indicating the selected antenna profile to the modem 120. The modem 120 then selects antenna tuning parameters (e.g. a payload from an LUT) based on the antenna profile signalled from the host 110. The modem 120 sends a control signal for tuning the antennas 140 to the antenna tuner 130. Antenna tuning is then performed by the antenna tuner 130.

Figure 2:
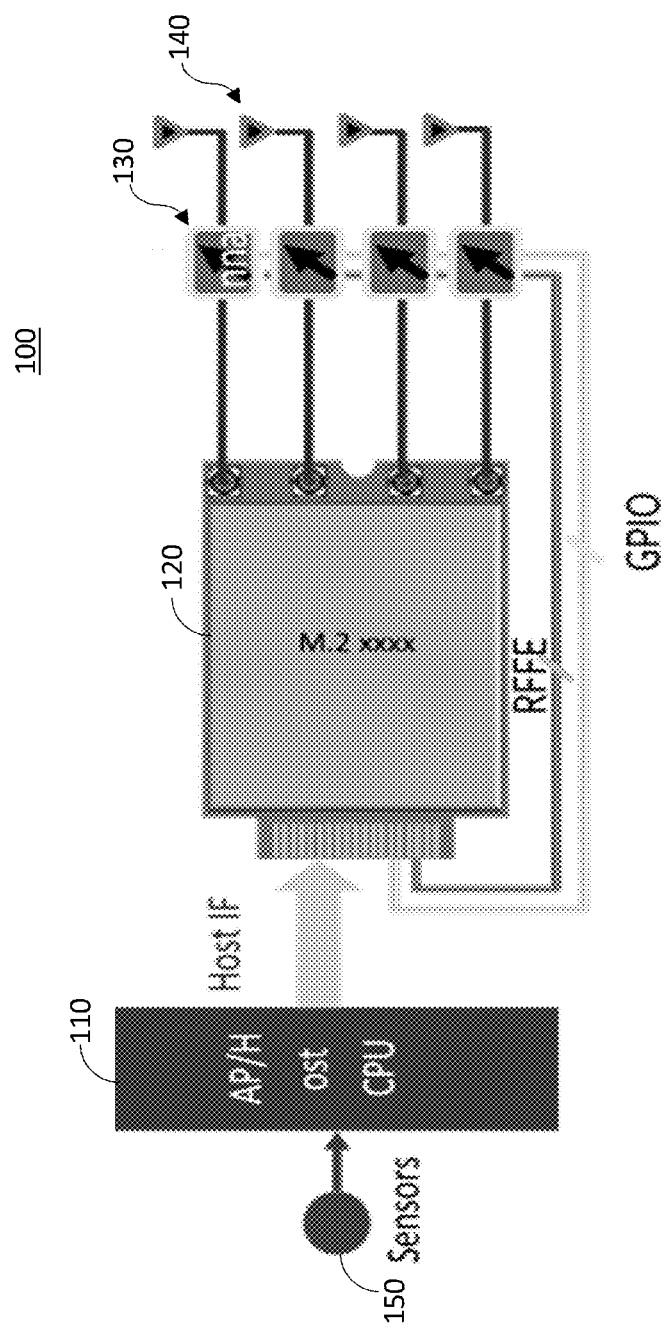
FIG. 2 shows an antenna tuner controlled by the modem.

FIG. 2 shows an antenna tuner 130 controlled by the modem 120. In the modem-centric antenna control system, as shown in FIG. 2, the antenna tuner 130 is controlled by the modem 120 via the radio frequency front-end (RFFE) or general-purpose input/output (GPIO) interface. In this modem-centric smart antenna implementation, features like antenna performance tuning, BAS, and SAR control are controlled by the modem 120 (i.e. by a micro-controller in the modem 120). The modem 120 receives information regarding the system operation or orientation of the apparatus (i.e. the antenna profile that is selected based on the inputs from the sensors) and based on this information the modem 120 controls the antennas 140 and the transmit power of the modem 120. In this implementation, the smart antenna design is tightly coupled to the modem design (i.e. modem-centric).

In the modem-centric antenna control system, the dependency on the modem firmware or software is very high and it is less dependent on the host 110 (i.e. CPU/AP) even though the host 110 is managing the key components drivers such as a sensor hub and its control drivers. If any modification is needed in the antenna design or if a system needs to add more antennas which requires a controller driver, there is a need for a support from the modem vendor for a design change or upgrade of the modem software. This may not be possible if the modem supplier is not able to support.

In addition, the system design is restrictive and wireless performance degrades if the modem used in the system does not support the smart antenna or advanced antenna tuning features. The advanced smart antenna features such as SAR control, 5G mm-wave radio frequency modules (RFMs) switching, and BAS cannot be used if the modem does not support these features. It may also restrict antenna placement in a system, which restricts to get better overall system performance. In addition, there is no common controller currently available which can support smart antenna features irrespective of the underlying wireless technologies such as cellular 4G, 5G, Wi-Fi, or the like.

A modem (both a cellular modem (e.g. 5G, LTE, mm-Wave, etc.) and a Wi-Fi modem (e.g. WiFi-6E, etc.)) needs to have a smart antenna control mechanism to get better wireless performance in all use cases and cover the different frequency bands of interest. Currently none of the Wi-Fi modules support a smart antenna and tuner, which is required to tune the antenna better. Antenna placement in a base of a laptop is restricted because there is no dynamic SAR controller available. If new use case features are required to be included, it may not guaranty that they will be supported by the modem or not.

Figure 3:
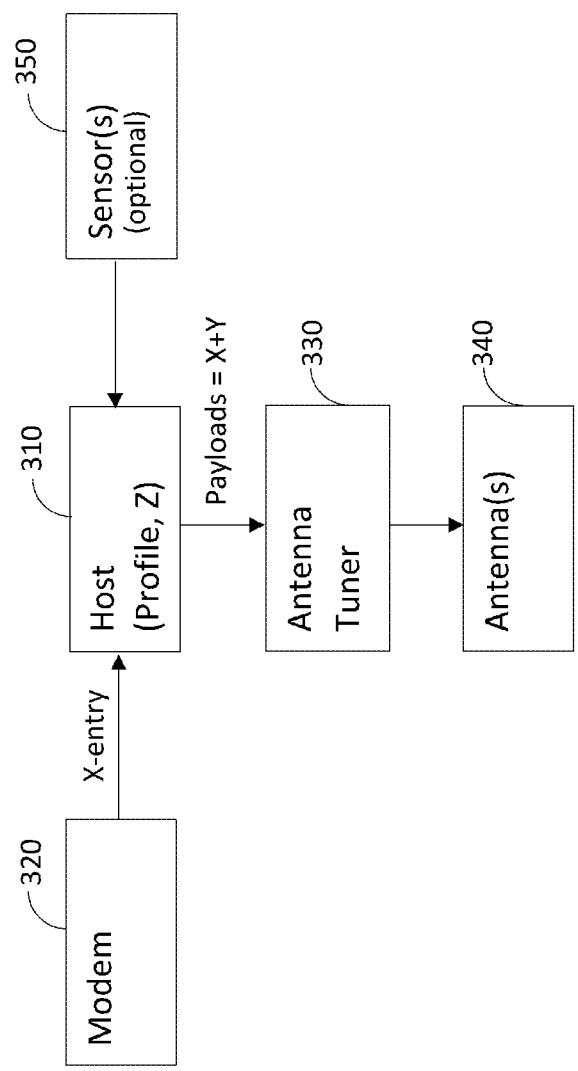
FIG. 3 is a block diagram of an example apparatus configured to implement a host-centric antenna control mechanism in accordance with one example.

FIG. 3 is a block diagram of an example apparatus 300 configured to implement a host-centric antenna control mechanism in accordance with one example. The apparatus 300 may be a user equipment. The user equipment may be a laptop computer, a desktop computer, a mobile phone, a smart phone, a tablet computer, any wearable devices with wireless communication capabilities, or the like.

The apparatus 300 includes a host 310, a modem 320, an antenna tuner 330, one or more antennas 340, and one or more sensors 350 (optional). The host 310 is a main processor of the apparatus 300 and may be a CPU, an AP, or the like. Hereafter, the terms "host," "processor," "CPU," and "AP" will be used interchangeably. The modem 320 is configured to process signals for wireless transmission and reception via one or more antennas 340. The modem 320 may support 3G, 4G, 5G, or any cellular communication protocols, IEEE 802.11-based WLAN protocols, GNSS, Bluetooth, or the like. The antenna tuner 330 (RF tuner/switches) is a device to improve power transfer between a transmitter and an antenna by matching the specified load impedance of the transmitter to the combined input impedance of the feedline and the antenna.

One or more sensors 350 may be provided in the apparatus 300 to implement smart antenna features such as antenna tuning, BAS, SAR control, RFM selection, or the like. The sensors 350 may be used to detect the mode or way that the apparatus 300 is used or operates ("use case"). The smart antenna features may be implemented according to the detected mode or way of system operation (i.e. use case). The sensors 350 may be a proximity sensor, an SAR sensor, an accelerometer, or the like. A proximity sensor is a sensor for detecting the presence of nearby objects without any physical contact. For example, a proximity sensor may emit an electromagnetic field or beam and detect a change in the field or return signal to detect the present of nearby objects. The sensor may be a Hall sensor. A Hall sensor is a device to measure the magnitude of a magnetic field and may be used for proximity sensing or acceleration sensing. An SAR is a measure of the rate at which RF energy is absorbed by a human body when exposed to electromagnetic field. An SAR sensor may detect a presence of a nearby human body. SAR sensors can accurately discriminate between an inanimate object and human body proximity. SAR sensors may be used in electronic devices, such as a smartphone or wearable device, to reduce and control RF emission power in the presence of a human body. An accelerometer is a device used to measure acceleration forces. An accelerometer may be used to detect the mobility status of the user equipment. In addition to the above disclosed sensors, any sensors that can be used to detect a mode or way of system operation can be provided in the apparatus 300. For example, in case of laptop computer, any sensors that can detect the operation mode of the laptop computer, such as clamshell, tablet, closed lid, 360-degree modes, may be used in the apparatus 300.

Antenna characteristics such as radiation efficiency, input impedance, gain/bandwidth, or the like may vary due to user interaction. For example, the antenna characteristics may vary depending on the mode, status, or way that the system (i.e. the user equipment) is used or operates (i.e. the "use case"). The use case may depend on the way or the orientation a user grabs the user equipment, or the way the user uses the user equipment. For example, if the user equipment is a mobile phone or a smart phone, the use case may be a hand-free mode, a right hand-held mode, a left hand-held mode, or the like, or it may be determined based on whether the user equipment is stationary or mobile, etc. If the user equipment is a laptop computer, the use case may be different modes of operations of the laptop computer, such as clamshell, tablet, closed lid, 360-degree, or the like. A clamshell mode is a configuration that allows a user to treat a laptop like a desktop, disabling the laptop's built-in screen, keyboard, speaker, or the like while using an external monitor. A tablet mode is activated when a tablet of a convertible laptop (2-in-1 laptop) is detached from its base or dock. A closed lid mode is a mode that a laptop operates with the built-in display being closed. A 360-degree mode allows a user to use a laptop with a 360-degree hinge in different configuration such as presentation or tent.

There is a need for "live re-tuning" of the antenna depending on the detected use case of the user equipment. The use case detection may be performed by the host 310 with various sensors 350 (e.g. a proximity sensor(s), a Hall sensor, an SAR sensor, an accelerometer, or the like). The host 310 receives inputs from the sensors 350 and determines the use case of the system based on the sensor inputs. The host 310 may maintain a plurality of antenna profiles (e.g. LUTs) for a plurality of use cases and selects an antenna profile corresponding to the determined use case.

The antenna characteristics may also vary depending on the operating frequency of the antenna. The number of frequency bands that need to be supported by user equipment (e.g. cellular phones, smart phones, tablet computers, laptop computers, wearable devices, etc.) is ever increasing and the frequency bands cover a wide range of frequencies. This makes the antenna design a true challenge. Therefore, there is a need for "live antenna tuning" based on the operating frequency of the user equipment as opposed to fixed RF matching components.

The antenna tuning may be performed by applying different antenna tuning parameters to the antenna tuner circuitry (e.g. antenna tuner IC). In some examples, the antenna tuning parameters may be retrieved from a pre-determined LUT based on a band allocation vector (BAV). For example, a BAV may comprise radio access technology (RAT), carrier aggregation (CA) scenarios, frequency bands and sub-bands, GNSS/WWAN mode, antenna port assignment, Tx/Rx mode, etc. The host 310 receives RF parameters including the BAV information from the modem 320 and then retrieves the parameters for antenna tuning from an LUT based on the received RF parameters. The host 310 then sends a control signal (i.e. antenna configuration data) to the antenna tuner 330 for controlling/configuring the antennas 340 including selecting/switching one or more antennas 340, adjusting the characteristics of one or more antennas 340, selecting/switching an RFM(s) for transmission and reception, adjusting a modem power for transmission, or the like.

The host 310 may include a plurality of LUTs (e.g. 16 LUTs) for storing antenna tuning parameters for different use cases. For example, one LUT may include a set of parameters for all entries assigned to a hands-free use case (Profile 0), and another LUT may include a set of payloads for all entries assigned to a left hand-held use case (Profile 1), etc. The host 310 may select one of the LUTs based on the determined use case and select antenna tuning parameters (i.e. payload) from the selected LUT based on the RF parameters received from the modem 320. Once the antenna profile information is provided by a host sub-system, via a provided application programming interface (API), the antenna tuner software module on the host applies the pre-determined antenna tuning parameters retrieved from the LUT to the antenna tuner IC.

Figure 4:
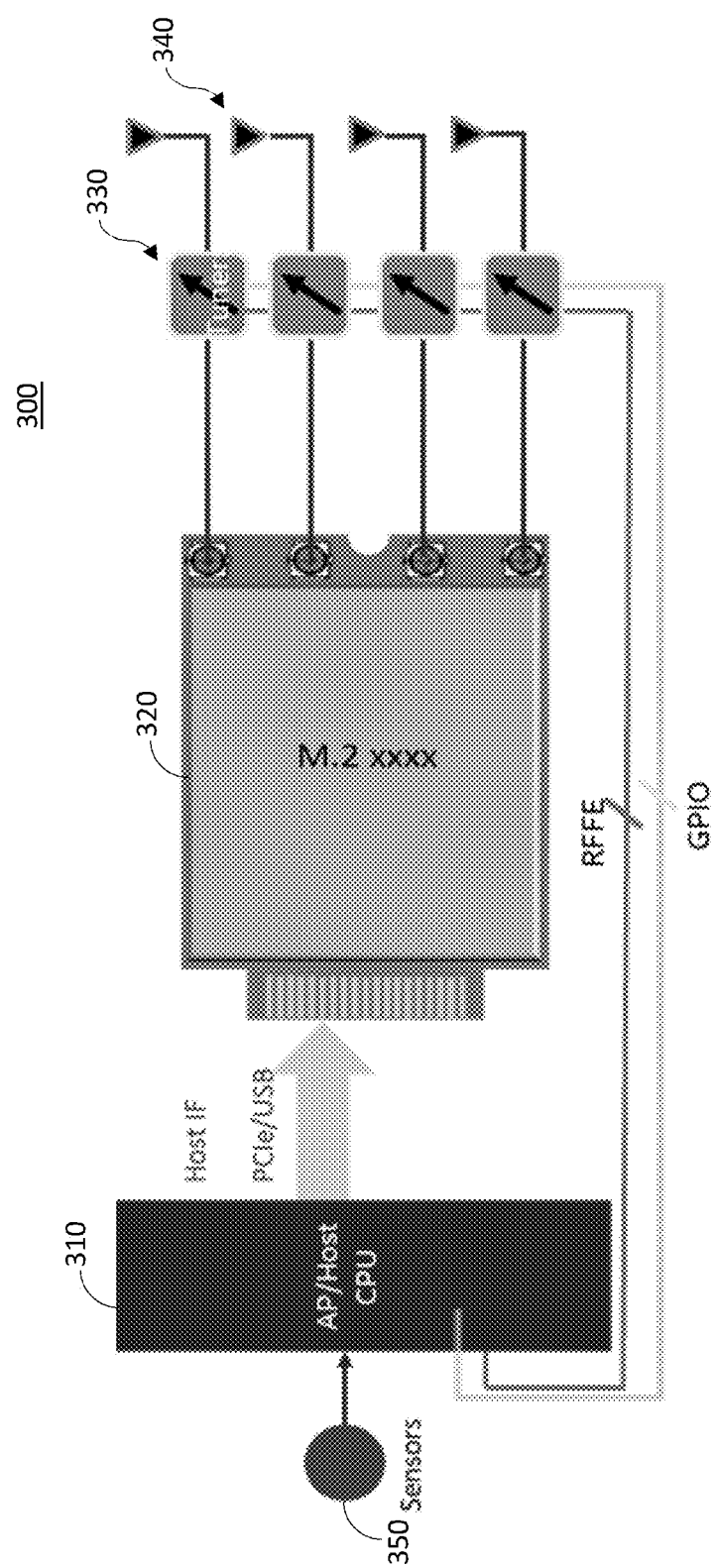
FIG. 4 shows an antenna tuner controlled by the host processor.

FIG. 4 shows an antenna tuner 330 controlled by the host 310. In the host-centric antenna control system, as shown in FIG. 4, the antenna tuner circuitry 330 may be controlled by the host 310, for example via the RFFE or GPIO interface. In the host-centric smart antenna implementation, an antenna tuner software module runs on the host 310. The antenna tuner software module on the host 310 selects the antenna profile based on inputs from the sensors, obtains the relevant RF parameters including operating frequency information (e.g. BAV) from the modem 320, and selects (e.g. from the pre-defined LUT) the antenna tuner configuration based on the use case and the frequency information. The antenna tuner software module may tune or select/switch an antenna(s) 340, select/switch an RFM(s), or determine modem power for best performance independently of the underlying wireless technology (e.g. for a Wi-Fi modem or a 4G/5G modem).

In the host-centric smart antenna control mechanism, advanced smart antenna features (such as antenna tuning, best antenna selection, RFM selection, SAR control, or the like) can be controlled by the host 310 (e.g. a CPU, an AP). The sensors 350 (e.g. a Hall sensor, an SAR sensor, a proximity sensor, an accelerometer, etc.) send information to the host 310 for detection of the use case scenarios. The selection of the best antenna (i.e. BAS) may be performed by the host 310 based on the inputs from the sensors 350. This may be applicable for sub-6 GHz 5G antennas as well as 5G mm-wave antenna modules. With the host-centric smart antenna control mechanism, a centralized SAR control for all the radio transmitters is possible.

With the host-centric antenna control, the host 310 can manage and control the antenna system without dependency of antenna performance from the wireless modem 320. The antenna tuner software module (which can be a single application running on the host 310) may tune any wireless systems, including 3G, 4G, 5G (sub-6 GHz and mm-Wave), Wi-Fi, Bluetooth, GNSS, and other wireless systems. With the host-centric antenna control, SAR and BAS may be controlled in a more effective way directly from the host 310. A system-specific use case profile may also be added for any wireless antenna modules. With the host-centric antenna control, antenna placement and control mechanism do not need to be dependent on a cellular modem or a Wi-Fi module provider.

Smart antennas may be implemented in systems where there is not enough space available to provide a wide multi-band antenna to cover all the required frequency bands for the radios such as LTE, 5G cellular radios, or the like. One of the smart antenna applications is to tune the antenna for the interested radio frequency band to achieve better connectivity. In the host-centric antenna control system, smart antenna features, such as antenna tuning and switching, mm-wave RFMs switching, BAS, SAR control, or the like are controlled by the host 310. The host-centric antenna control system may be implemented for either open loop or closed loop antenna control. The open loop antenna tuning changes the antenna characteristics based on sensor's input that controls the antennas configurations or switches to the antenna tuning values corresponding to predefined scenarios stored in the lookup table.

Figure 5:
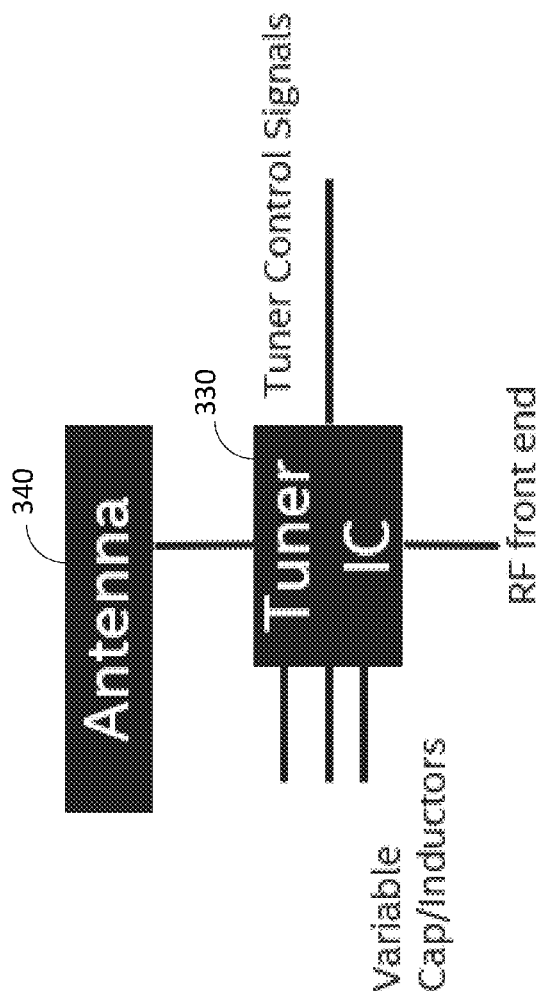
FIG. 5 shows an antenna tuner implementation in accordance with one example.
Figure 6:
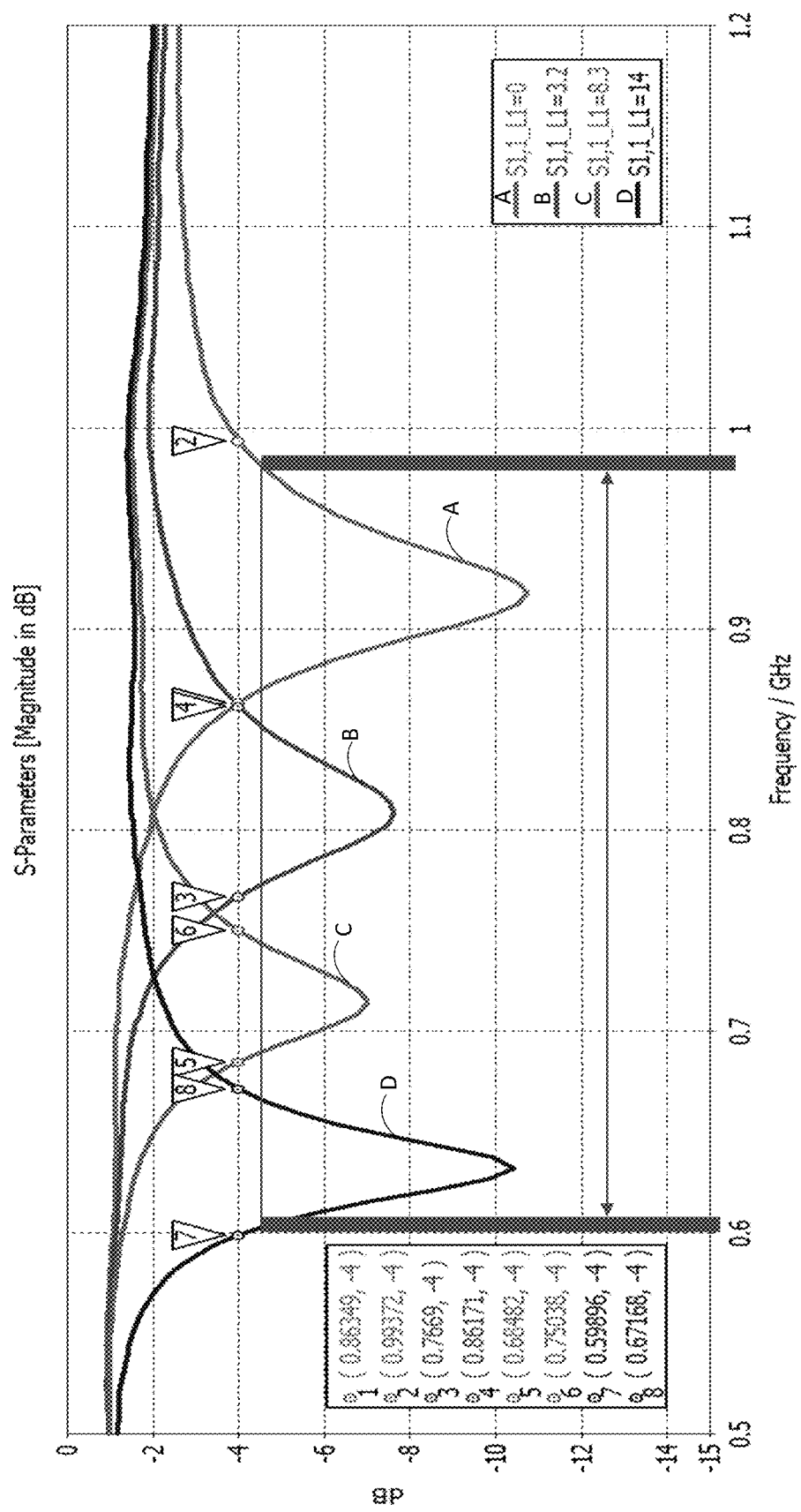
FIG. 6 shows example antenna frequency band shifting for different states or values of the antenna tuner.

FIG. 5 shows an antenna tuner implementation in accordance with one example. An antenna tuner (circuitry) 330 is coupled between the antenna 340 and the RF front end. The antenna tuner 330 may be a tuner IC. The antenna tuner 330 may include RF switches and tunable capacitor and tunable inductor circuits that can be used for antenna frequency band switching and/or adjustment of antenna characteristics. Different values of the inductors and/or capacitors may be selected and connected to the antenna by the antenna tuner 330 based on the tuner control signal from the controller (i.e. the host 310). FIG. 6 shows example antenna frequency band shifting for different states or values of the antenna tuner 330.

Figure 7:
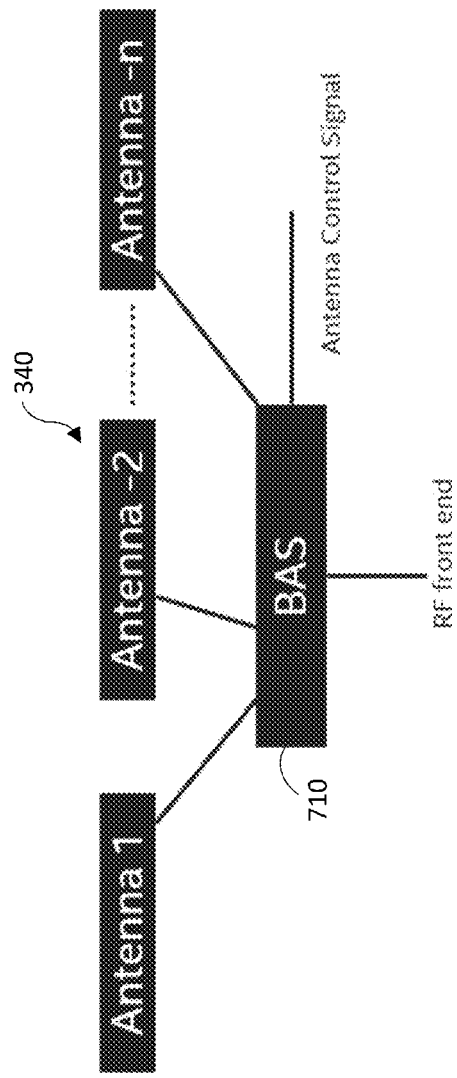
FIG. 7 shows an example of the BAS implementation.

Best antenna selection (BAS) is one of the smart antenna techniques to switch among a plurality of antennas and connect to a better performing antenna. FIG. 7 shows an example of the BAS implementation. The BAS switch 710 (which may be a part of the antenna tuner 330) is a switch which allows to change antennas for the same radios to connect with a better and more efficient antenna. The BAS switch 710 may couple at least one antenna among the antennas 340 to the RF front end based on the antenna control signal from the host 310.

Figure 8:
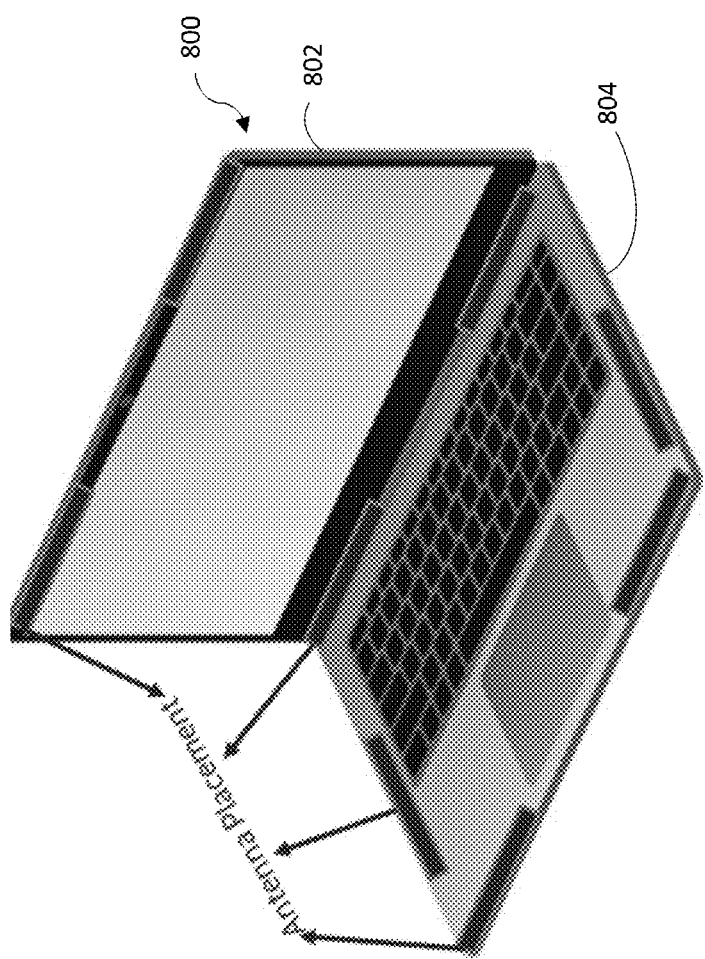
FIG. 8 shows various antenna locations in a laptop computer as one example of a user equipment.

A plurality of antennas may be provided in a user equipment. As an example, FIG. 8 shows various antenna locations in a laptop computer 800 as one example of a user equipment. In case of laptop computer, a plurality of antennas may be placed in a lid 802 and/or a base 804 of the laptop computer. Some of the antennas would work better when the lid 802 of the laptop computer is open, and some of the antennas would work better when the lid 802 is closed. The performance of each antenna may vary depending on the use case scenarios of the laptop computer (i.e. a user equipment). One or more of the antennas may be selected based on the control signal from the host 310.

The BAS feature may be used to switch an antenna to solve an SAR issue. An SAR sensor or a proximity sensor may detect human proximity near a transmit antenna. Upon detection of a human body in proximity of an antenna, a transmit path may be diverted to another antenna to reduce the RF exposure to the user. This will help not to reduce the transmit power of the radio and maintain a better throughput and connectivity. This scheme may be used to control any antenna used for LTE, 5G, WLAN radios, etc.

Figure 9:
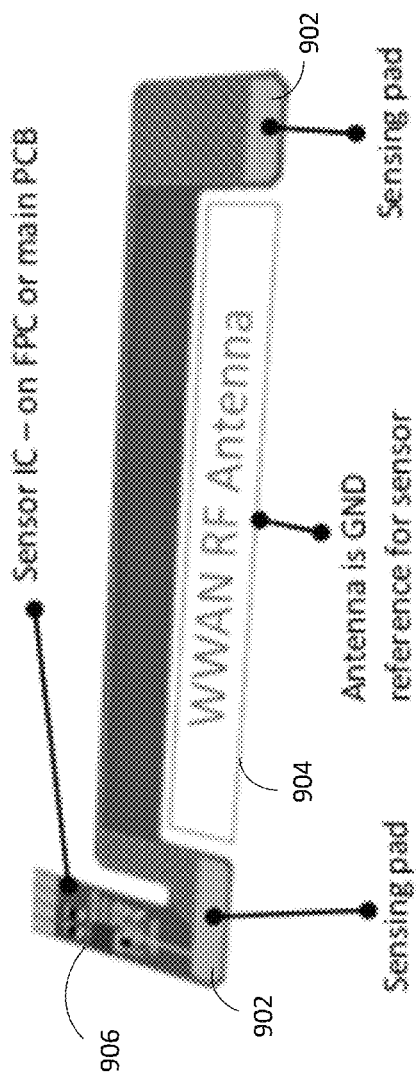
FIG. 9 shows a proximity sensing pad placed next to an antenna 904 in accordance with one example.

FIG. 9 shows a proximity sensing pad 902 placed next to an antenna 904 in accordance with one example. SAR sensing pads 902 may be placed next to an antenna 904 to detect human proximity near the antenna 904. The sensor IC 906 may be placed on a flexible printed circuit (FPC) or a main printed circuit board (PCB) of the system. The data obtained by the SAR sensing pads 902 may be used by the host 310 to switch the transmit antenna to reduce the RF exposure to a user without changing the antenna transmit power. The SAR sensor can also help to retune the antenna if the antenna gets detuned due to its surrounding environment changes.

The host-centric antenna control mechanism provides more flexibility in controlling the transmit power for SAR control in multi-transmitter and/or multi-radio cases. In some examples, a user equipment may include multiple transmitters and/or multiple radio modules. A sensor(s) may be provided next to each antenna in the user equipment for proximity detection of a human body. Since the host 310 will have the data from the sensor hub regarding the proximity detection the host 310 may trigger power reduction only to that antenna which detected a presence of nearby human body. With this scheme, the transmit power of the radio in multiple transmit chains may not be reduced and a better throughput and connectivity may be achieved. This scheme can be applied to any antennas used for any wireless systems, such as LTE, 5G, or WLAN radios. This scheme can help in reducing the allocation of more pins in the modem pin configuration. In a modem, more than one pin (2 or more pins) may be assigned to control or back-off the dedicated transmit power of a signal transmitted by multiple antennas in TX uplink carrier aggregation or TX uplink multiple-input multiple-output (MIMO) configuration. In host-centric antenna control mechanism, the host can easily identify the antenna which is coming closer to the human body with the help of a proximity detector and instruct the modem to apply TX power back-off only to the right antenna. This scheme can help in reducing the allocation of more pins in the modem.

This will also help in proper power multi radio solution by applying the power back of to the right radio instated of bath radio. In multi-radio solution, if both WWAN and WLAN modules transmitting the power and only a WWAN antenna reports the human body proximity detection, the host-centric antenna control mechanism can help in applying the power back to the right radio instead of both radios.

In the host-centric antenna control system, an antenna tuner software module (driver) runs on the host 310 similar to operating system (OS). The antenna tuner software module obtains the relevant RF parameters (e.g. BAV information) from the modem 320 and independently tunes the antenna 340 for best performance. The host-centric antenna control scheme is independent from the modem 320 and it removes antenna control dependency from the modem. The host-centric antenna control system can control any wireless system antenna, e.g. 4G/5G antenna, mm-wave RFM, Wi-Fi antenna, or any other system antenna. With the host-centric antenna control scheme, centralized SAR control may be performed for all the radio transmitters.

Figure 10:
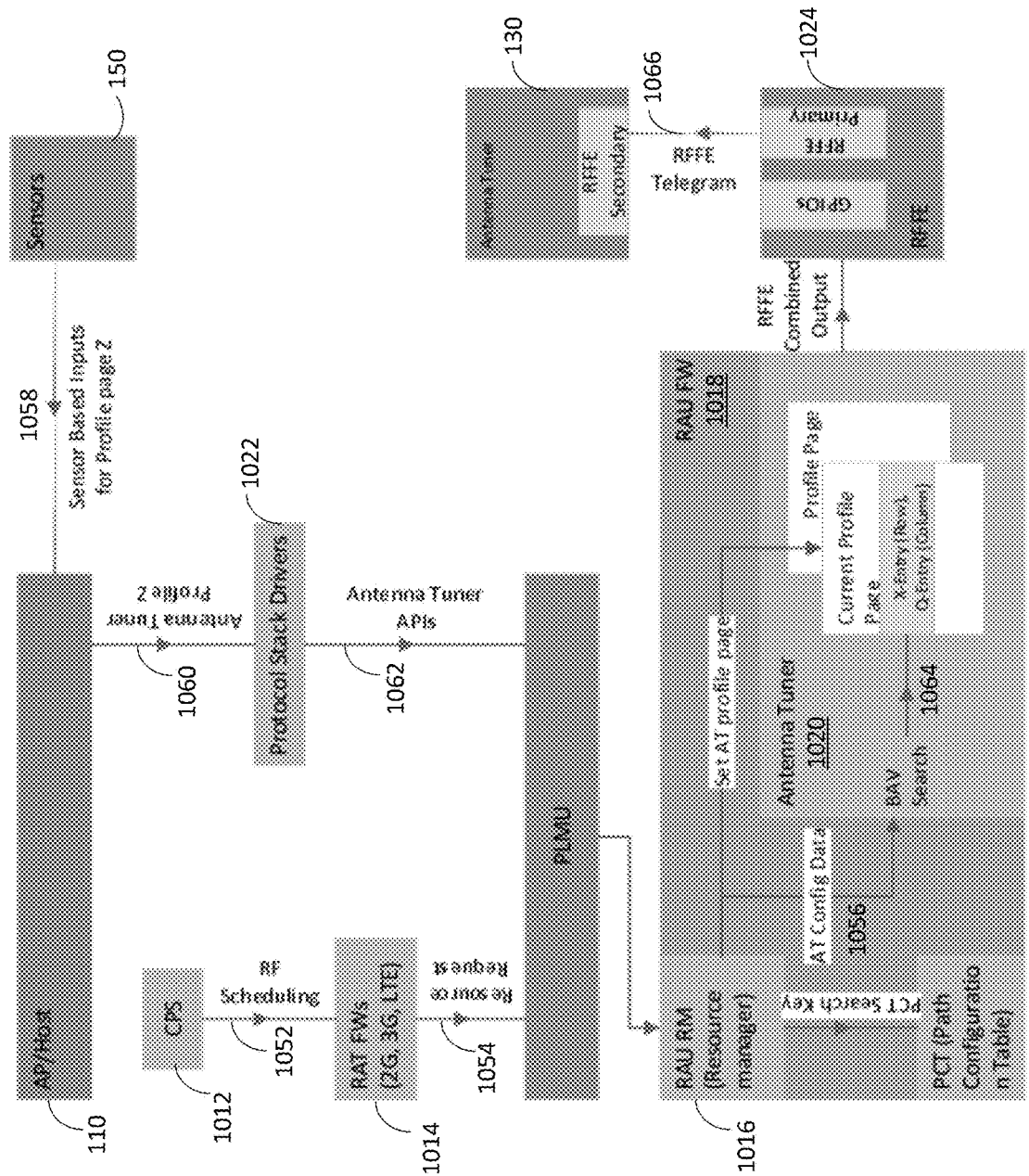
FIG. 10 shows a process for modem-centric antenna control.

FIG. 10 shows a process for modem-centric antenna control. In the modem-centric antenna control system, the antenna control is associated with the modem software and hardware. The host 110 (e.g. a CPU/AP) is connected to the sensors 150 and all the antenna control-related processes are performed by the modem 120. In the modem-centric antenna control system, the antenna tuner software module 1020 is part of the modem software and controls the antenna tuner hardware 130 using MIPI-RFFE or GPIOs. The antenna tuner software module 1020 includes the software algorithm for tuning the antenna, a plurality of profile pages (e.g. LUTs), and an RFFE driver module.

A cellular protocol stack (CPS) 1012 schedules RF transmit or receive activity (1052). The RAT firmware (FW) 1014 (e.g. 2G, 3G, 4G, 5G, etc.) prepares and triggers a resource request toward a radio access unit (RAU) FW (1054). In response to the resource request received via a physical layer local memory unit (PLMU), the RAU resource manager 1016 starts preparing hardware for transmission and/or reception and sends antenna tuning (AT) configuration data to the antenna tuner module 1020 (1056).

The host 110 receives inputs from various sensors 150 (e.g. a proximity sensor, a Hall sensor, an SAR sensor, an accelerometer, etc.) (1058). Based on the sensor inputs, the host 110 determines the use case and may trigger changes in the antenna tuner profile. The host 110 may send a request to the antenna tuner software module 1020 in the modem to set the corresponding profile page as active using a protocol stack driver 1022 (1060). The protocol stack driver 1022 acts as an interface between the host 110 and the RAU FW 1018. The protocol stack driver 1022 requests for profile page change based on the inputs from the host (1062). This antenna tuner profile change may be done independently of the RAT FW process of the transmit/receive scheduling.

Based on the scheduled RF activity, the antenna tuner software module 1020 performs a BAV search on the active profile page to extract the required configuration data for the antenna tuner circuitry 130 (1064). The configuration data may be sent to the antenna tuner circuitry as RFFE telegrams. The RFFE control interface 1024 triggers the antenna tuner telegram towards the antenna tuner circuitry 130 (1066). Antenna tuning is then performed by the antenna tuner circuitry 130 based on the antenna tuner telegram.

Figure 11:
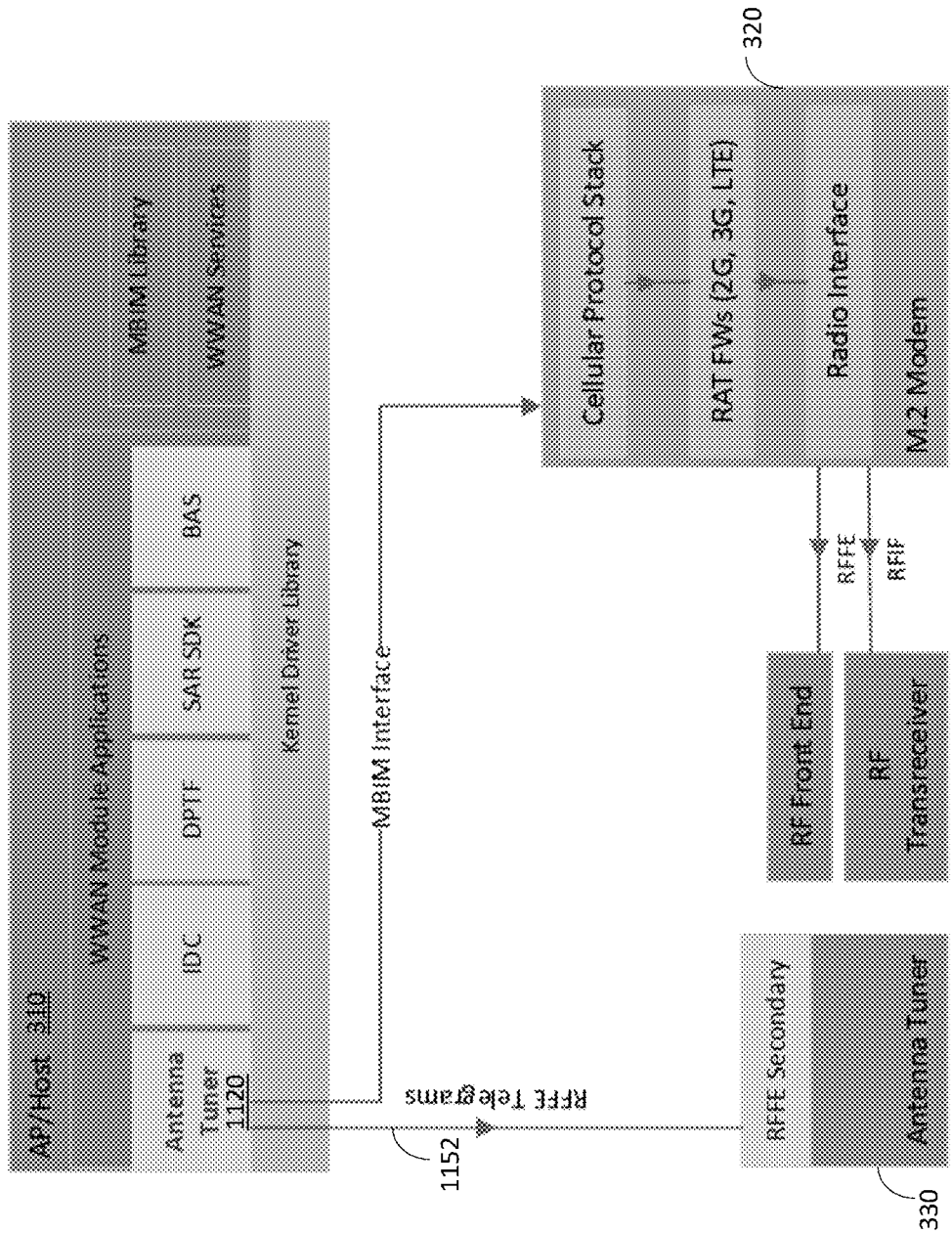
FIG. 11 shows an example host-centric antenna control process in accordance with one example.

FIG. 11 shows an example host-centric antenna control process in accordance with one example. In the host-centric antenna control system, an antenna tuner software module 1120 is part of the host 310 and can be used to tune or configure the antenna(s) 340 for any wireless communication modules (e.g. WLAN, cellular, Bluetooth, etc.). The antenna tuner module 1120 in the host 310 may send antenna configuration data to the antenna tuner circuitry 330 using RFFE telegrams 1152. The antenna tuner module 1120 on the host 310 may interact with the modem 320 via a mobile broadband interface model (MBIM) interface.

Figure 12:
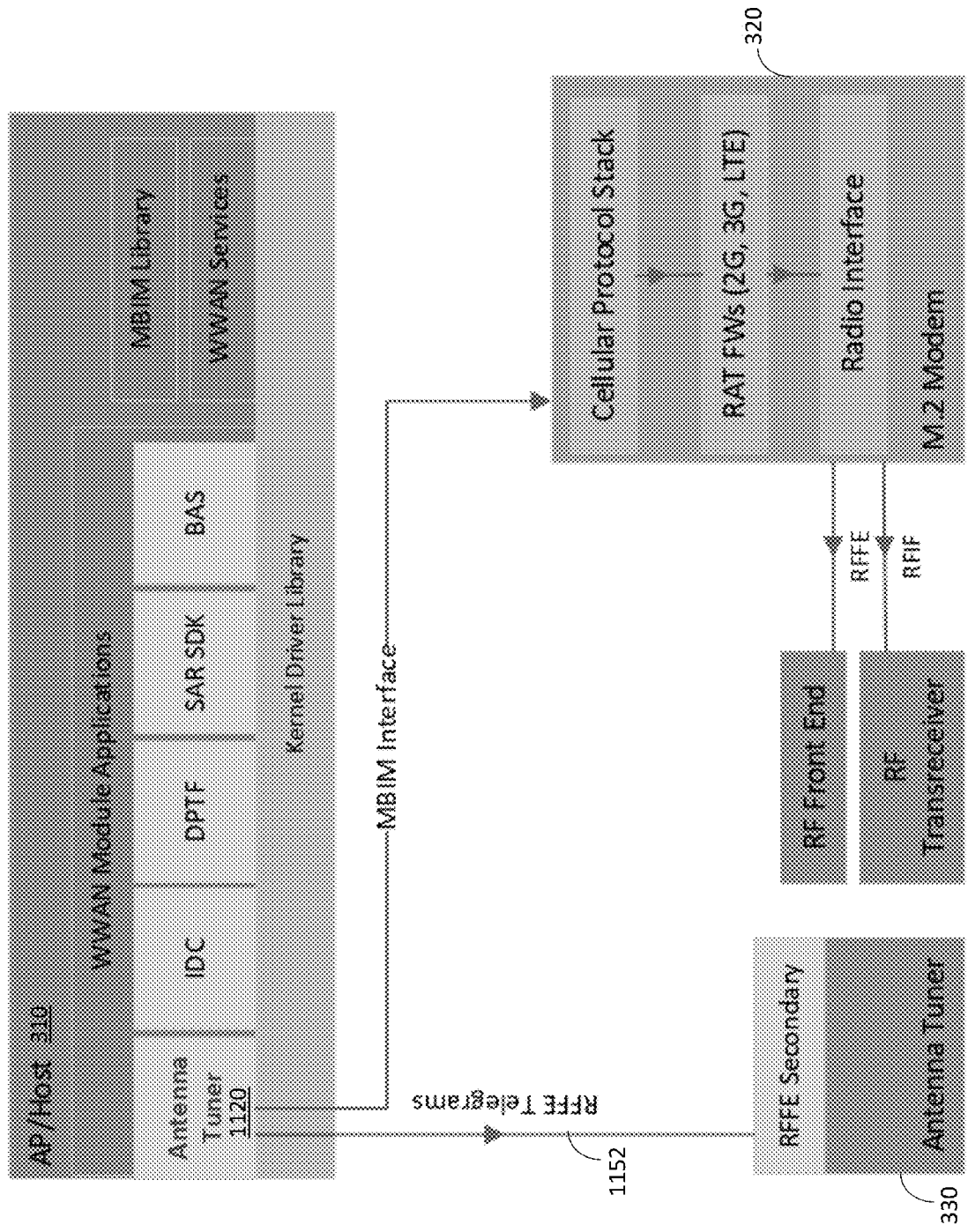
FIG. 12 shows an example host-centric antenna control process for a cellular modem case in accordance with one example.

FIG. 12 shows an example host-centric antenna control process for a cellular modem case in accordance with one example. Hereafter, some examples will be explained with reference to a wireless wide access network (WWAN) cellular module but the examples are applicable to any wireless communication modules. The antenna tuner software module 1120 is part of the applications in the host 310 and the antenna profile page selection is performed by the host 310 based on inputs from sensors. The antenna tuner circuitry 330 is directly connected to the host 310 and antenna RF signals are connected to the RF front-end of the modem. The antenna tuner module 1120 in the host 310 may send antenna configuration data to the antenna tuner circuitry 330 using RFFE telegrams 1152. The antenna tuner module 1120 on the host 310 may interact with the modem 320 via an MBIM interface.

Figure 13:
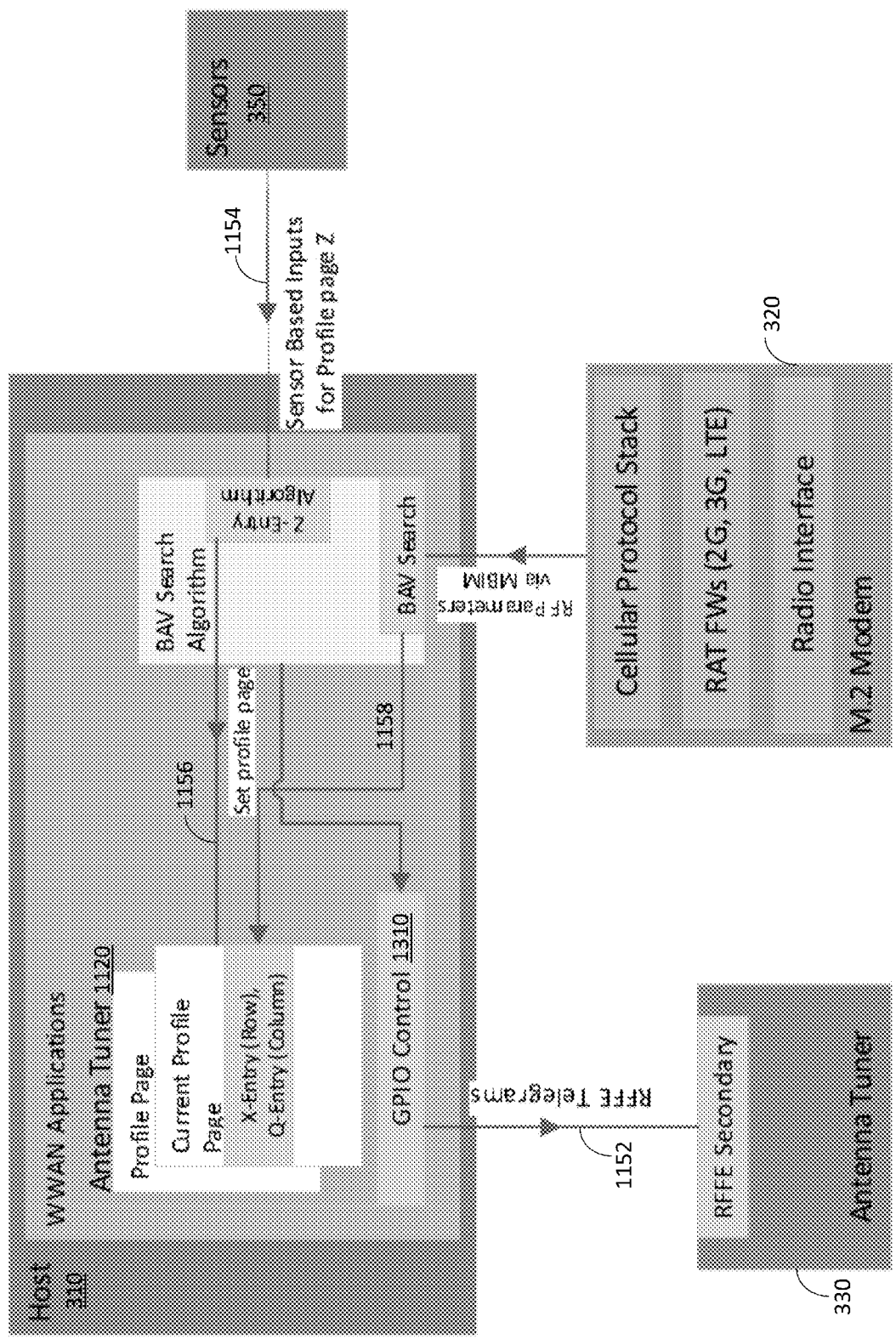
FIGS. 13-15 show examples of host-centric antenna control using different interfaces.

FIG. 13 shows an example host-centric antenna control using GPIO as primary interface and MIPI-RFFI as secondary interface for antenna tuning in accordance with one example. In the host-centric antenna control system, the antenna tuner software module 1120 is part of the applications in the host 310. In this example, the antenna tuning is performed using a GPIO as a controlling interface. The antenna tuner module 1120 on the host 310 may perform both open and closed loop antenna tuning. The antenna tuner software module 1120 controls the antenna tuner hardware 330. The antenna tuner software module 1120 includes the software algorithm for tuning the antenna, a plurality of profile pages (look-up tables) and a GPIO control module.

The host 310 receives inputs from various sensors 350, such as a proximity sensor, an SAR sensor, a Hall sensor, an accelerometer, or the like (1154). Based on the sensor inputs, the antenna tuner module 1120 sets a profile page corresponding to the current use case of the user equipment as active (1156). The antenna tuner software module 1120 also receives RF parameters via MIBM from the modem 320 (1158) and performs a BAV search on the active profile page to extract the required configuration data for the antenna tuner circuitry 330 based on the received RF parameters. The antenna configuration data may be sent to the antenna tuner circuitry 330 as RFFE telegrams (1152). The GPIO control interface 1310 triggers the RFFE telegrams towards the antenna tuner circuitry 330. Antenna tuning is then performed by the antenna tuner circuitry 330 based on the RFFE telegram.

Figure 14:
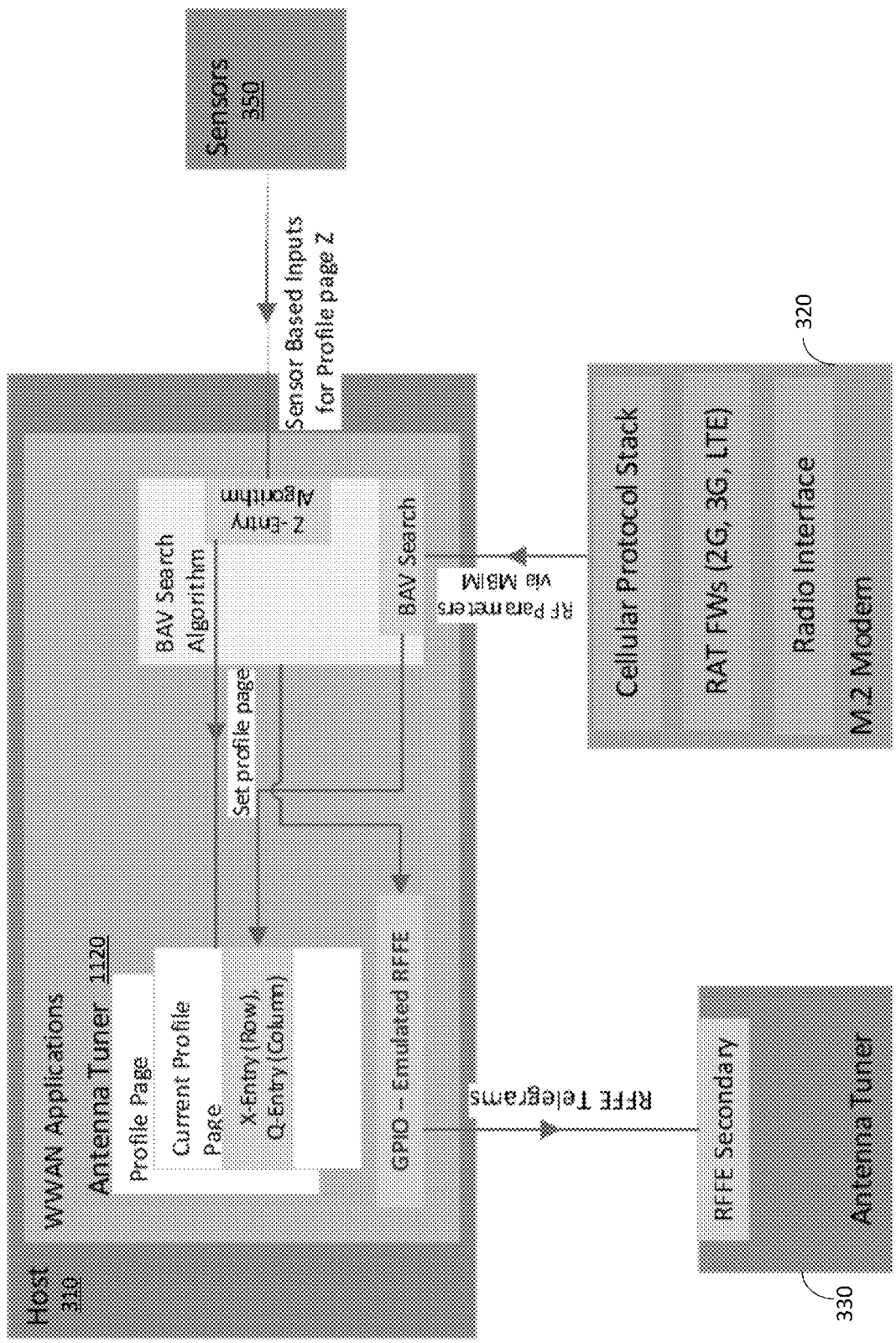

FIG. 14 shows an example host-centric antenna control using GPIO-emulated RFFE as primary interface and MIPI-RFFI as secondary interface for antenna tuning in accordance with another example. In this example, the antenna tuning is performed using a GPIO-emulated RFFE as a controlling interface.

Figure 15:
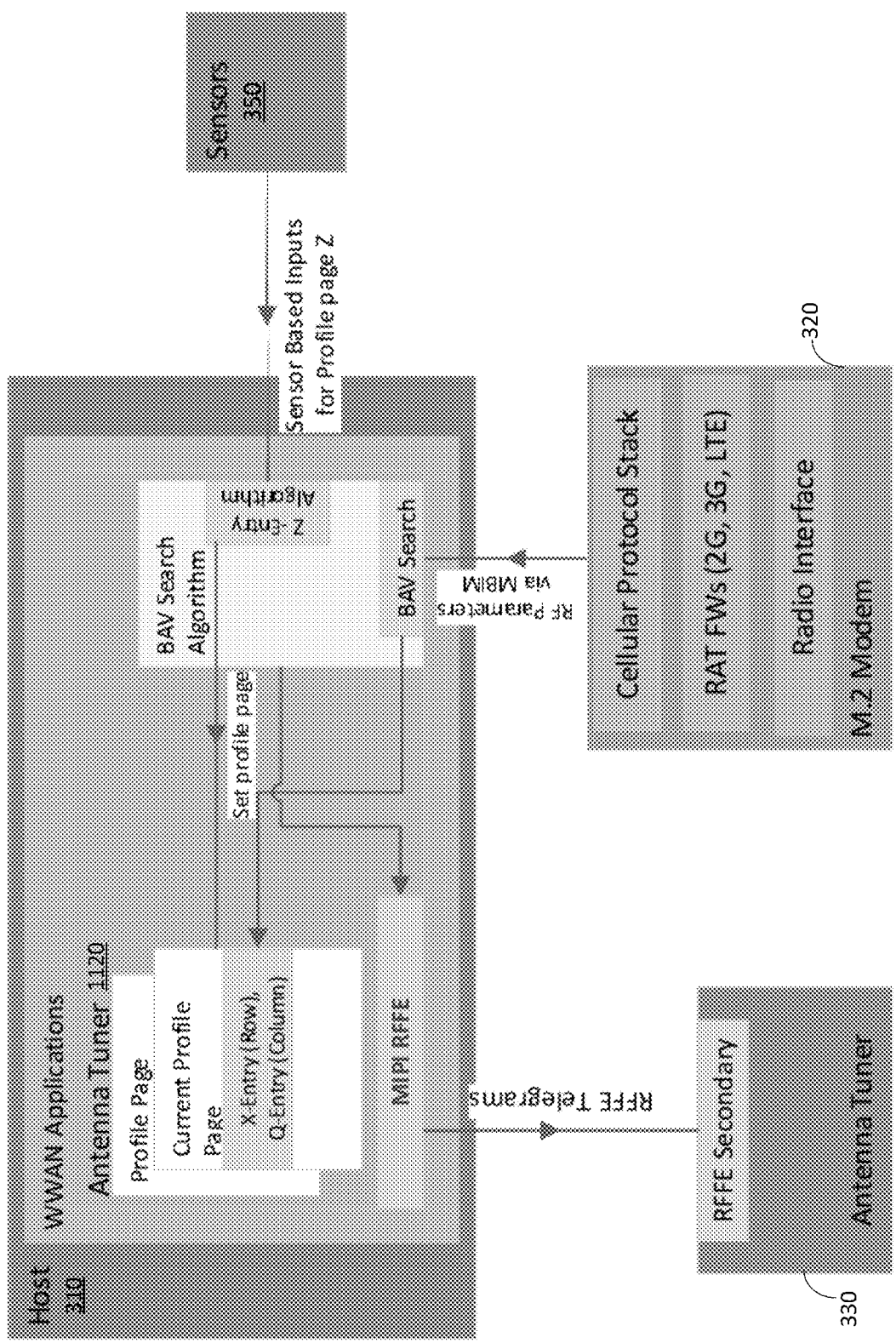

FIG. 15 shows an example host-centric antenna control using MIPI RFFE as primary interface and MIPI-RFFI as secondary interface for antenna tuning in accordance with still another example. In this example, the antenna tuning is performed using a pure MIPI RFFE as a controlling interface.

The host-centric antenna control mechanism in accordance with the examples disclosed herein helps in reducing the pin count of the modem IC. The host-centric antenna control mechanism will be a generic solution for any wireless communication systems (including WWAN and WLAN). With the host-centric antenna control mechanism, multiple use case scenario-based antenna tuning profiles can be implemented commonly for both WWAN and WLAN based on sensors. The host-centric antenna tuner can be scaled to support BAS based on sensor inputs. One common antenna tuner tool may be implemented for all smart antenna systems. The host-centric antenna control mechanism is less dependent on the modem IP. The host-centric antenna control mechanism does not have an impact on power consumption which remains the same as in case of modem-centric antenna tuning.

Figure 16:
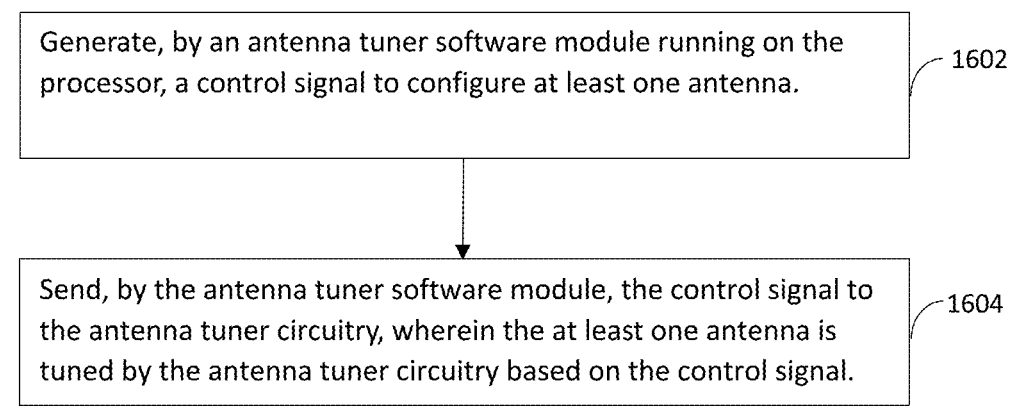
FIG. 16 is a flow diagram of a method for implementing host-centric antenna control.

FIG. 16 is a flow diagram of a method for implementing host-centric antenna control in an apparatus such as a user equipment in accordance with one example. The apparatus includes a plurality of antennas, a processor, an antenna tuner circuitry, at least one sensor, and a wireless modem. The method includes generating, by an antenna tuner software module running on the processor, a control signal to configure at least one antenna (1602). The method further includes sending, by the antenna tuner software module, the control signal to the antenna tuner circuitry, wherein the at least one antenna is tuned by the antenna tuner circuitry based on the control signal (1604). The method may further include receiving, by the antenna tuner software module, inputs from the at least one sensor, and generating the control signal based on the inputs from the at least one sensor. The method may further include receiving, by the antenna tuner software module, RF parameters from the wireless modem, wherein the control signal is generated by the antenna tuner software module based on the RF parameters.

Figure 17:
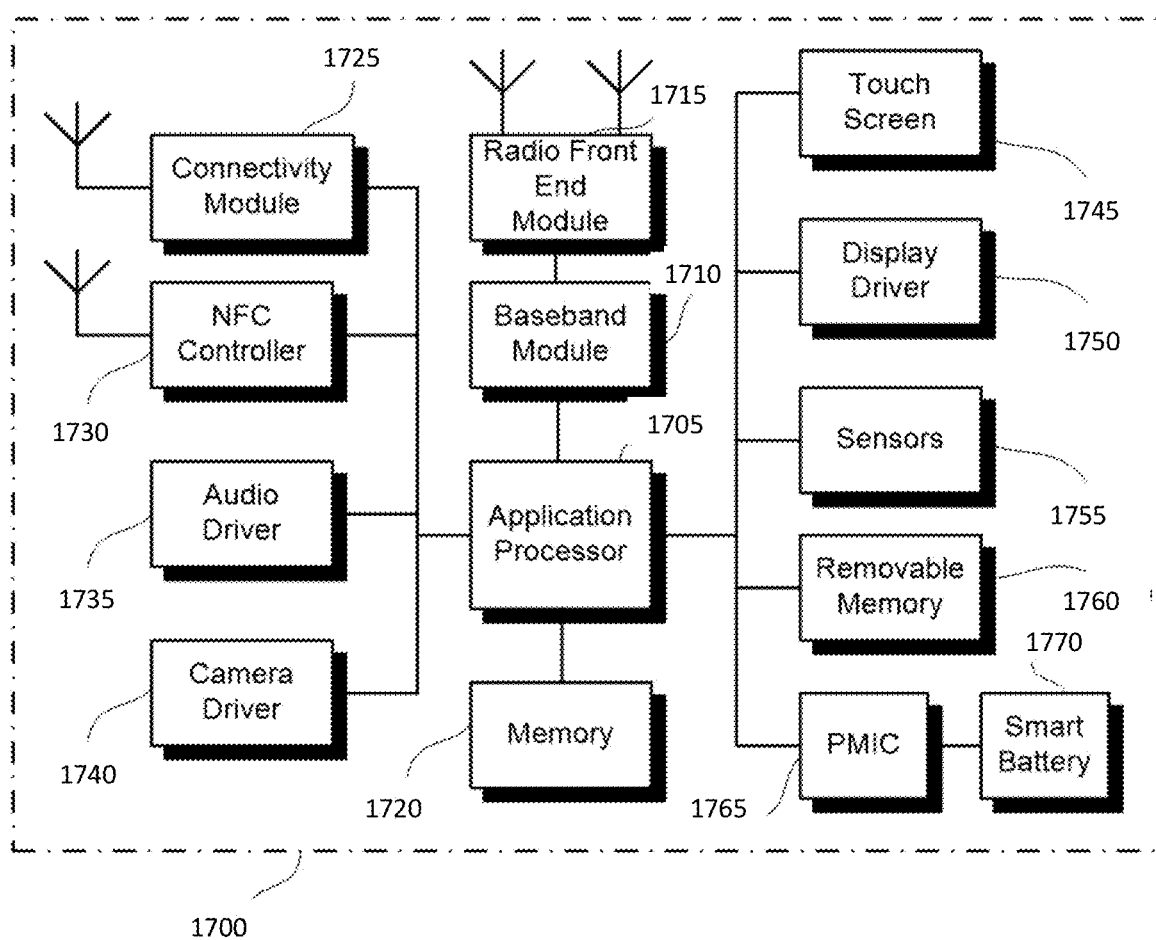
FIG. 17 illustrates a user device in which the examples disclosed herein may be implemented.

FIG. 17 illustrates a user device 1700 in which the examples disclosed herein may be implemented. For example, the examples disclosed herein may be implemented in the radio front-end module 1715, in the baseband module 1710, etc. The user device 1700 may be a mobile device in some aspects and includes an application processor 1705, baseband processor 1710 (also referred to as a baseband module), radio front end module (RFEM) 1715, memory 1720, connectivity module 1725, near field communication (NFC) controller 1730, audio driver 1735, camera driver 1740, touch screen 1745, display driver 1750, sensors 1755, removable memory 1760, power management integrated circuit (PMIC) 1765 and smart battery 1770.

In some aspects, application processor 1705 may include, for example, one or more CPU cores and one or more of cache memory, low drop-out voltage regulators (LDOs), interrupt controllers, serial interfaces such as serial peripheral interface (SPI), inter-integrated circuit ($I^2C$) or universal programmable serial interface module, real time clock (RTC), timer-counters including interval and watchdog timers, general purpose input-output (IO), memory card controllers such as secure digital/multi-media card (SD/MMC) or similar, universal serial bus (USB) interfaces, mobile industry processor interface (MIPI) interfaces and Joint Test Access Group (JTAG) test access ports.

In some aspects, baseband module 1710 may be implemented, for example, as a solder-down substrate including one or more integrated circuits, a single packaged integrated circuit soldered to a main circuit board, and/or a multi-chip module containing two or more integrated circuits.

Figure 18:
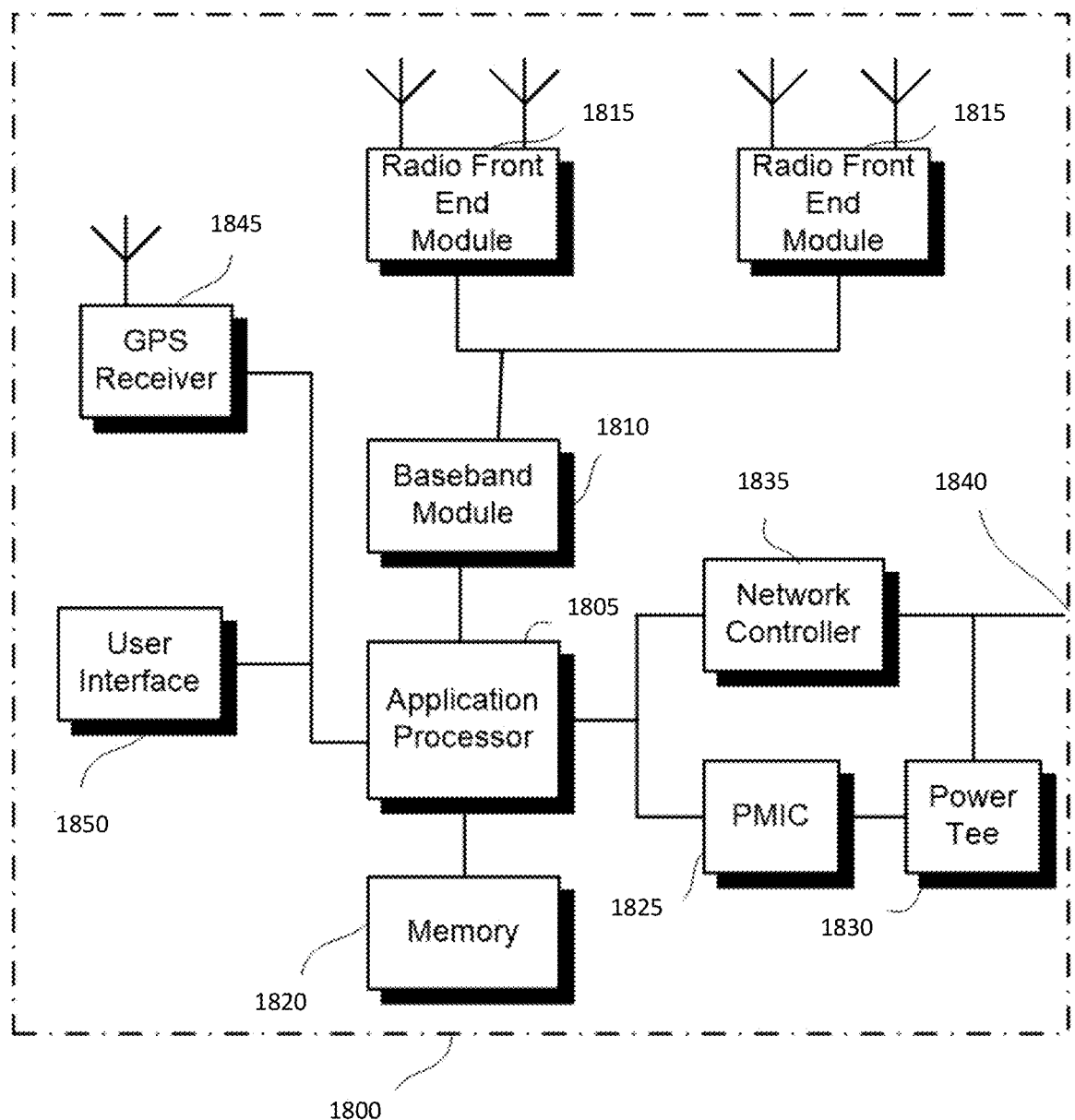
FIG. 18 illustrates a base station or infrastructure equipment radio head in which the examples disclosed herein may be implemented.

FIG. 18 illustrates a base station or infrastructure equipment radio head 1800 in which the examples disclosed herein may be implemented. For example, the examples disclosed herein may be implemented in the radio front-end module 1815, in the baseband module 1810, etc. The base station radio head 1800 may include one or more of application processor 1805, baseband modules 1810, one or more radio front end modules 1815, memory 1820, power management circuitry 1825, power tee circuitry 1830, network controller 1835, network interface connector 1840, satellite navigation receiver module 1845, and user interface 1850.

In some aspects, application processor 1805 may include one or more CPU cores and one or more of cache memory, low drop-out voltage regulators (LDOs), interrupt controllers, serial interfaces such as SPI, $I^2C$ or universal programmable serial interface module, real time clock (RTC), timer-counters including interval and watchdog timers, general purpose IO, memory card controllers such as SD/MMC or similar, USB interfaces, MIPI interfaces and Joint Test Access Group (JTAG) test access ports.

In some aspects, baseband processor 1810 may be implemented, for example, as a solder-down substrate including one or more integrated circuits, a single packaged integrated circuit soldered to a main circuit board or a multi-chip module containing two or more integrated circuits.

In some aspects, memory 1820 may include one or more of volatile memory including dynamic random access memory (DRAM) and/or synchronous dynamic random access memory (SDRAM), and nonvolatile memory (NVM) including high-speed electrically erasable memory (commonly referred to as Flash memory), phase change random access memory (PRAM), magneto resistive random access memory (MRAM) and/or a three-dimensional crosspoint memory. Memory 1820 may be implemented as one or more of solder down packaged integrated circuits, socketed memory modules and plug-in memory cards.

In some aspects, power management integrated circuitry 1825 may include one or more of voltage regulators, surge protectors, power alarm detection circuitry and one or more backup power sources such as a battery or capacitor. Power alarm detection circuitry may detect one or more of brown out (under-voltage) and surge (over-voltage) conditions.

In some aspects, power tee circuitry 1830 may provide for electrical power drawn from a network cable to provide both power supply and data connectivity to the base station radio head 1800 using a single cable.

In some aspects, network controller 1835 may provide connectivity to a network using a standard network interface protocol such as Ethernet. Network connectivity may be provided using a physical connection which is one of electrical (commonly referred to as copper interconnect), optical or wireless.

In some aspects, satellite navigation receiver module 1845 may include circuitry to receive and decode signals transmitted by one or more navigation satellite constellations such as the global positioning system (GPS), Globalnaya Navigatsionnaya Sputnikovaya Sistema (GLONASS), Galileo and/or BeiDou. The receiver 1845 may provide data to application processor 1805 which may include one or more of position data or time data. Application processor 1805 may use time data to synchronize operations with other radio base stations.

In some aspects, user interface 1850 may include one or more of physical or virtual buttons, such as a reset button, one or more indicators such as light emitting diodes (LEDs) and a display screen.

Another example is a computer program having a program code for performing at least one of the methods described herein, when the computer program is executed on a computer, a processor, or a programmable hardware component. Another example is a machine-readable storage including machine readable instructions, when executed, to implement a method or realize an apparatus as described herein. A further example is a machine-readable medium including code, when executed, to cause a machine to perform any of the methods described herein.

The examples as described herein may be summarized as follows:

Example 1 is an apparatus for implementing host-centric antenna control. The apparatus may include a plurality of antennas for wireless transmission and reception, a wireless modem configured to process a signal for wireless transmission and reception via at least one of the antennas, a processor configured to run an antenna tuner software module, and an antenna tuner circuitry configured to switch or tune the at least one antenna based on a control signal. The antenna tuner software module is configured to generate the control signal to configure at least one antenna.

Example 2 is the apparatus of example 1, further including at least one sensor coupled to the processor. The antenna tuner software module may be configured to generate the control signal based on inputs from the at least one sensor.

Example 3 is the apparatus of example 2, wherein the antenna tuner software module is configured to receive RF parameters from the wireless modem and generate the control signal based on the RF parameters.

Example 4 is the apparatus as in any one of examples 2-3, wherein the antenna tuner software module is configured to select one or more antennas for transmission based on the inputs from the at least one sensor.

Example 5 is the apparatus as in any one of examples 2-4, further comprising a plurality of radio frequency modules. The antenna tuner software module is configured to select one of the radio frequency modules for transmission or reception based on the inputs from the at least one sensor.

Example 6 is the apparatus (300) as in any one of examples 2-5, wherein the sensor is at least one of a proximity sensor, a Hall sensor, a specific absorption rate, SAR, sensor, or an accelerometer.

Example 7 is the apparatus as in any one of examples 2-6, wherein the antenna tuner software module is configured to select an antenna profile among a plurality of antenna profiles based on the inputs from the at least one sensor and select antenna tuning parameters from the selected antenna profile.

Example 8 is the apparatus of example 7, wherein the antenna tuner software module is configured to select an entry in the selected antenna profile based on RF parameters received from the wireless modem.

Example 9 is the apparatus as in any one of examples 1-8, wherein the antenna tuner software module is configured to send the control signal to the antenna tuner circuitry using one of a RFFE interface, a GPIO, or a GPIO-emulated RFFE interface.

Example 10 is a method for implementing host-centric antenna control in an apparatus. The apparatus includes a plurality of antennas, a processor, an antenna tuner circuitry, and a wireless modem. The method includes generating, by an antenna tuner software module running on the processor, a control signal to configure at least one antenna, and sending, by the antenna tuner software module, the control signal to the antenna tuner circuitry. The at least one antenna is selected or tuned by the antenna tuner circuitry based on the control signal.

Example 11 is the method of example 10, wherein the apparatus further includes at least one sensor, and the method further includes receiving, by the antenna tuner software module, inputs from at least one sensor. The control signal may be generated by the antenna tuner software module based on the inputs from the at least one sensor.

Example 12 is the method as in any one of examples 10-11, further including receiving, by the antenna tuner software module, RF parameters from the wireless modem, wherein the control signal is generated by the antenna tuner software module based on the RF parameters.

Example 13 is a processor for implementing host-centric antenna control in an apparatus. The apparatus includes a plurality of antennas for wireless transmission and reception, a wireless modem for processing a signal for wireless transmission and reception via at least one of the antennas, and an antenna tuner circuitry. The processor includes an antenna tuner software module configured to generate a control signal to configure at least one antenna, and an interface configured to send the control signal to the antenna tuner circuitry.

Example 14 is the processor of example 13, wherein the antenna tuner software module is configured to receive inputs from at least one sensor provided in the user equipment and generate the control signal based on the inputs from the at least one sensor.

Example 15 is the processor as in any one of examples 13-14, wherein the antenna tuner software module is configured to receive RF parameters from the wireless modem and generate the control signal based on the RF parameters.

The aspects and features mentioned and described together with one or more of the previously detailed examples and figures, may as well be combined with one or more of the other examples in order to replace a like feature of the other example or in order to additionally introduce the feature to the other example.

Examples may further be or relate to a computer program having a program code for performing one or more of the above methods, when the computer program is executed on a computer or processor. Steps, operations or processes of various above-described methods may be performed by programmed computers or processors. Examples may also cover program storage devices such as digital data storage media, which are machine, processor or computer readable and encode machine-executable, processor-executable or computer-executable programs of instructions. The instructions perform or cause performing some or all of the acts of the above-described methods. The program storage devices may comprise or be, for instance, digital memories, magnetic storage media such as magnetic disks and magnetic tapes, hard drives, or optically readable digital data storage media. Further examples may also cover computers, processors or control units programmed to perform the acts of the above-described methods or (field) programmable logic arrays ((F)PLAs) or (field) programmable gate arrays ((F) PGAs), programmed to perform the acts of the above-described methods.

The description and drawings merely illustrate the principles of the disclosure. Furthermore, all examples recited herein are principally intended expressly to be only for pedagogical purposes to aid the reader in understanding the principles of the disclosure and the concepts contributed by the inventor(s) to furthering the art. All statements herein reciting principles, aspects, and examples of the disclosure, as well as specific examples thereof, are intended to encompass equivalents thereof.

A functional block denoted as "means for . . . " performing a certain function may refer to a circuit that is configured to perform a certain function. Hence, a "means for s.th." may be implemented as a "means configured to or suited for s.th.", such as a device or a circuit configured to or suited for the respective task.

Functions of various elements shown in the figures, including any functional blocks labeled as "means", "means for providing a sensor signal", "means for generating a transmit signal.", etc., may be implemented in the form of dedicated hardware, such as "a signal provider", "a signal processing unit", "a processor", "a controller", etc. as well as hardware capable of executing software in association with appropriate software. When provided by a processor, the functions may be provided by a single dedicated processor, by a single shared processor, or by a plurality of individual processors, some of which or all of which may be shared. However, the term "processor" or "controller" is by far not limited to hardware exclusively capable of executing software but may include digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included.

A block diagram may, for instance, illustrate a high-level circuit diagram implementing the principles of the disclosure. Similarly, a flow chart, a flow diagram, a state transition diagram, a pseudo code, and the like may represent various processes, operations or steps, which may, for instance, be substantially represented in computer readable medium and so executed by a computer or processor, whether or not such computer or processor is explicitly shown. Methods disclosed in the specification or in the claims may be implemented by a device having means for performing each of the respective acts of these methods.

It is to be understood that the disclosure of multiple acts, processes, operations, steps or functions disclosed in the specification or claims may not be construed as to be within the specific order, unless explicitly or implicitly stated otherwise, for instance for technical reasons. Therefore, the disclosure of multiple acts or functions will not limit these to a particular order unless such acts or functions are not interchangeable for technical reasons. Furthermore, in some examples a single act, function, process, operation or step may include or may be broken into multiple sub-acts, -functions, -processes, -operations or -steps, respectively. Such sub acts may be included and part of the disclosure of this single act unless explicitly excluded.

Furthermore, the following claims are hereby incorporated into the detailed description, where each claim may stand on its own as a separate example. While each claim may stand on its own as a separate example, it is to be noted that—although a dependent claim may refer in the claims to a specific combination with one or more other claims—other examples may also include a combination of the dependent claim with the subject matter of each other dependent or independent claim. Such combinations are explicitly proposed herein unless it is stated that a specific combination is not intended. Furthermore, it is intended to include also features of a claim to any other independent claim even if this claim is not directly made dependent to the independent claim.

What is claimed is:

1. An apparatus for implementing host-centric antenna control, comprising: a plurality of antennas for wireless transmission and reception; a wireless modem configured to process a signal for wireless transmission and reception via at least one antenna of the plurality of antennas; a host processor of the apparatus configured to run an antenna tuner software module, wherein the host processor and the wireless modem are separate components of the apparatus, and the antenna tuner software module is configured to generate a control signal to configure the at least one antenna of the plurality of antennas; and an antenna tuner circuitry configured to switch or tune the at least one antenna of the plurality of antennas based on the control signal, wherein the antenna tuner software module is configured to receive radio frequency (RF) parameters from the wireless modem and generate the control signal based on the RF parameters, wherein the RF parameters include a band allocation vector (BAV) including at least one of radio access technology, a carrier aggregation scenario, a frequency band and sub-band, a Global Navigation Satellite System or wireless wide area network mode, antenna port assignment, or a transmit/receive (Tx/Rx) mode.

2. The apparatus of claim 1, further comprising:
at least one sensor coupled to the host processor, wherein the antenna tuner software module is configured to generate the control signal based on inputs from the at least one sensor.

3. The apparatus of claim 2, wherein the antenna tuner software module is configured to select one or more antennas for transmission based on the inputs from the at least one sensor.

4. The apparatus of claim 2, further comprising a plurality of radio frequency modules, wherein the antenna tuner software module is configured to select one of the plurality of radio frequency modules for transmission or reception based on the inputs from the at least one sensor.

5. The apparatus of claim 2, wherein the at least one sensor is at least one of a proximity sensor, a Hall sensor, a specific absorption rate, SAR, sensor, or an accelerometer.

6. The apparatus of claim 2, wherein the antenna tuner software module is configured to select an antenna profile among a plurality of antenna profiles based on the inputs from the at least one sensor and select antenna tuning parameters from the selected antenna profile.

7. The apparatus of claim 6, wherein the antenna tuner software module is configured to select an entry in the selected antenna profile based on the RF parameters received from the wireless modem.

8. The apparatus of claim 2, wherein the antenna tuner software module is configured to send the control signal to the antenna tuner circuitry using one of a radio frequency front-end, RFFE, interface, a general purpose input/output, GPIO, or a GPIO-emulated RFFE interface.

9. A method for implementing host-centric antenna control in an apparatus, the apparatus including a plurality of antennas, a host processor, an antenna tuner circuitry, and a wireless modem, the method comprising:
receiving, by an antenna tuner software module running on the host processor of the apparatus, radio frequency (RF) parameters from the wireless modem, wherein the RF parameters include a band allocation vector (BAV) including at least one of radio access technology, a carrier aggregation scenario, a frequency band and sub-band, a Global Navigation Satellite System or wireless wide area network mode, antenna port assignment, or a transmit/receive (Tx/Rx) mode;
generating, by the antenna tuner software module, a control signal based on the RF parameters to configure at least one antenna of the plurality of antennas; and
sending, by the antenna tuner software module, the control signal to the antenna tuner circuitry,
wherein the at least one antenna of the plurality of antennas is selected or tuned by the antenna tuner circuitry based on the control signal,
wherein the host processor and the wireless modem are separate components of the apparatus.

10. The method of claim 9, wherein the apparatus further includes at least one sensor, and the method further comprising:
receiving, by the antenna tuner software module, inputs from the at least one sensor,
wherein the control signal is generated by the antenna tuner software module based on the inputs from the at least one sensor.

11. The method of claim 10, wherein the antenna tuner software module is configured to select one or more antennas for transmission based on the inputs from the at least one sensor.

12. The method of claim 10, wherein the apparatus further comprises a plurality of radio frequency modules, wherein one of the plurality of radio frequency modules for transmission or reception is selected by the antenna tuner software module based on the inputs from the at least one sensor.

13. The method of claim 10, wherein an antenna profile is selected by the antenna tuner software module among a plurality of antenna profiles based on the inputs from the at least one sensor and antenna tuning parameters are selected from the selected antenna profile.

14. A host processor of an apparatus for implementing host-centric antenna control in the apparatus, the apparatus including the host processor, a plurality of antennas for wireless transmission and reception, a wireless modem for processing a signal for wireless transmission and reception via at least one antenna of the plurality of antennas, and an antenna tuner circuitry, the host processor comprising: an antenna tuner software module configured to generate a control signal to configure the at least one antenna of the plurality of antennas; and an interface configured to send the control signal to the antenna tuner circuitry, wherein the antenna tuner software module is configured to receive radio frequency (RF) parameters from the wireless modem and generate the control signal based on the RF parameters, wherein the RF parameters include a band allocation vector (BAV) including at least one of radio access technology, a carrier aggregation scenario, a frequency band and sub-band, a Global Navigation Satellite System or wireless wide area network mode, antenna port assignment, or a transmit/receive (Tx/Rx) mode, wherein the host processor and the wireless modem are separate components of the apparatus.

15. The host processor of claim 14, wherein the antenna tuner software module is configured to receive inputs from at least one sensor provided in a user equipment and generate the control signal based on the inputs from the at least one sensor.

16. The host processor of claim 15, wherein the antenna tuner software module is configured to select one or more antennas for transmission based on the inputs from the at least one sensor.

17. The host processor of claim 15, further comprising a plurality of radio frequency modules, wherein the antenna tuner software module is configured to select one of the plurality of radio frequency modules for transmission or reception based on the inputs from the at least one sensor.

18. The host processor of claim 15, wherein the antenna tuner software module is configured to select an antenna profile among a plurality of antenna profiles based on the inputs from the at least one sensor and select antenna tuning parameters from the selected antenna profile.

* * * * *